United States Patent [19]
Rosich et al.

[11] Patent Number: 5,551,002
[45] Date of Patent: Aug. 27, 1996

[54] SYSTEM FOR CONTROLLING A WRITE CACHE AND MERGING ADJACENT DATA BLOCKS FOR WRITE OPERATIONS

[75] Inventors: Mitchell N. Rosich; Eric S. Noya, both of Groton; Randy M. Arnott, Clinton, all of Mass.

[73] Assignee: Digital Equipment Corporation, Maynard, Mass.

[21] Appl. No.: 86,453

[22] Filed: Jul. 1, 1993

[51] Int. Cl.⁶ .................................................. G06F 12/12
[52] U.S. Cl. .................... 395/461; 395/463; 395/487; 364/DIG. 1; 364/243.41; 364/246.12; 364/252.1; 364/254.2; 364/254.3
[58] Field of Search .................... 364 MS/200 MS File, 364 MS/900 MS File; 395/400, 425, 403, 440, 444, 445, 446, 447, 448, 449, 450, 452, 453, 455, 456, 457, 460, 461, 463, 464, 487

[56] References Cited

U.S. PATENT DOCUMENTS

| | | | |
|---|---|---|---|
| 4,603,380 | 6/1986 | Easton et al. | 395/440 |
| 4,636,946 | 1/1987 | Hartung et al. | 395/463 |
| 4,974,197 | 11/1990 | Blount et al. | 395/250 |
| 5,150,472 | 9/1992 | Blank et al. | 395/464 |
| 5,309,451 | 5/1994 | Noya et al. | 371/40.4 |
| 5,341,479 | 8/1994 | Dean et al. | 395/250 |
| 5,392,415 | 2/1995 | Badonvinatz et al. | 395/406 |
| 5,394,537 | 2/1995 | Courts et al. | 395/412 |

*Primary Examiner*—Eddie P. Chan
*Assistant Examiner*—Hiep T. Nguyen
*Attorney, Agent, or Firm*—Lindsay G. McGuinness; Denis G. Maloney; Arthur W. Fisher

[57] ABSTRACT

A data storage system includes a multi-tasking processor which manages a write cache to identify adjacent blocks held in the write cache which are to be included in a next write operation, while at the same time handling data transfer requests from a system host. The processor monitors the write cache and when the cache has fewer than a predetermined number of storage locations free, initiates a block-merge task. The processor then determines which block in the write cache is least recently used and, based on virtual block numbers assigned to the data blocks, identifies the blocks in the write cache which are adjacent to the least recently used block and are within the same chunk as that block. The processor maintains a list of these adjacent blocks and the locations in which the blocks are held in the write cache. Thereafter, when the cache has fewer than a lower predetermined number of adjacent blocks free, the processor transfers block identifiers and the addresses of the blocks in the write cache to the data storage device, which allows the data storage device to retrieve the data blocks from the write cache in the order in which they are to be stored on the storage device.

11 Claims, 6 Drawing Sheets

SYSTEM FOR CONTROLLING A WRITE CACHE AND MERGING ADJACENT DATA BLOCKS FOR WRITE OPERATIONS

FIELD OF THE INVENTION

This invention relates generally to disk drives, and in particular, to a technique for merging cached write requests.

BACKGROUND

Advantages in electronic circuit technology have greatly increased the speed at which central processing unit ("CPU") components of a computer system operate. CPU integrated circuits having cycle times in excess of 60 MHz are now widely available. System components such as random access memories ("RAMs") are typically constructed using the same technologies, and thus, their cycle times match the speeds of the central processing unit components.

The speed with which secondary storage devices, such as disk drives, operate is generally slower than that of the other components in the computer system. The time to complete a disk access is largely dominated by the time required for mechanical drive components to move a read/write head to the proper location relative to the disk and the time for the storage location to rotate under the head. Once the head is in position over the storage location, it performs the remainder of the read or write operation at speeds comparable to those of the components of the CPU.

The time required to position the read/write head over the storage location is commonly referred to as seek time. Fast disk drives have seek times generally in the range of 8–10 milliseconds and are thus several orders of magnitude longer than the time required for the head integrated circuit components to retrieve data from the disk or store data on the disk.

Data are recorded on the disks in concentric tracks, which are divided into sectors. Each sector holds a block of data. A block is the smallest quantity of data which can be written to a disk. A "chunk," which consists of a number of adjacent blocks, is the largest quantity of data written to a disk in a single write operation without performing a seek operation to re-position the read/write head. Chunks vary in size from system to system, depending on the architecture of the system and the applications performed by the system.

A write operation that involves a single block of data is inefficient, since very little data is stored after a time-consuming seek operation. One way to increase the efficiency of the system is to retain the data blocks to be written to the disk in a buffer, accumulate a number of blocks and include them in a disk write operation. The accumulated blocks must be intended for contiguous storage locations on the disk to be included in the write operation, however, Such blocks are referred to as "adjacent blocks." Buffers for accumulating these data blocks are commonly referred to as write caches.

Write caches, which must be non-volatile memories to protect the data from loss or corruption before they are stored on the storage device, are expensive. Accordingly, many systems use relatively small write caches. Further, these caches must be carefully managed to prevent loss of data and also to ensure that the efficiencies and advantages of including the cache in the system are not lost. This is particularly true because the data blocks held in the cache are not ordinarily held in the order in which they are to be stored on the disk. As data blocks are included in various write operations, the cache storage locations in which they were retained are freed. When data blocks are later added to the write cache they are placed in the free locations, which may or may not be contiguous. Generally, the locations are not contiguous and the data blocks are thus "scattered" throughout the cache.

It has been known for some time that requests for data from a disk typically are directed to related data, such as data files. These data files are often written to the disk in a single write operation and are stored in a number of physically adjacent sectors, or disk storage locations. Accordingly, a principle of "locality of reference" has developed among computer programmers which states: when data stored or to be stored at one location are accessed, there is a high probability that data stored or to be stored at physically adjacent locations will be accessed soon thereafter.

To take advantage of this principle, data to be written to a disk are held for a time in the write cache, so that they can be accessed relatively quickly, that is, without performing a disk read operation to retrieve them from the disk. Since it is likely that these data will be accessed relatively soon after they are sent for storage, the use of the cache speeds up the overall operation of the system. The system must keep track of which data blocks are held in the write cache to direct requests for these to the write cache instead of the disk.

Once the write cache is filled, the system performs one or more write operations to transfer data from the cache to the disk drive for storage therein. There are several techniques for managing the orderly transfer of data from the write cache to the drive. One known technique is to include in a disk write operation a search of the write cache for an adjacent data block. If an adjacent block is found, the system transfers both blocks to the disk as part of the disk write operation. This reduces the overall number of disk accesses, and thus, the overall number of the time-consuming seek operations.

Another technique for managing the write cache involves keeping a "least recently used" (LRU) queue. The LRU queue contains a list of blocks in their order of use. The LRU queue identifies blocks by their time of use and their "virtual block numbers," which are numbers associated with the intended storage locations of the blocks on the disk. Since it is likely that the system will access blocks which were more recently used before it again accesses the least recently used blocks, the system transfers these least recently used blocks to the disk while retaining the more recently used blocks in the cache for quick access by the CPU.

The techniques discussed above for managing the transfer of data from the write cache to the disk handle data in quantities of one or two blocks. They thus may not satisfactorily enhance the speed with which the system performs write operations. Accordingly, a technique which includes more data per write operation is needed.

Computer systems are more and more using arrays of disk drives, commonly referred to as *Redundant Arrays of Inexpensive Disks*, or "RAIDs." RAIDs are described by Patterson et al. in a report No. UCB/CSD87/891, December, 1987, Computer Science Division (EECS), Berkley, Calif. In various RAID architectures, data distributed over "n" drives is encoded to generate redundancy information for error protection and the redundancy information is stored on an n+1st drive. This provides error protection of the data in the event of the corruption or failure of one of the RAID drives.

Each write operation involves 4 disk accesses, 2 to retrieve data and old redundancy information for encoding, and 2 to store the data and the redundancy information. The time to perform a write operation in a RAID is increased over that of a write operation to a single drive, since the heads on the various drives must each be properly positioned. Such systems thus trade overall speed for data security.

Techniques for increasing the efficiency of write operations are needed for RAID systems. While either of the techniques discussed above for managing a write cache provide certain benefits to the RAID systems, a technique for including more data per write operation would rather dramatically increase the efficiency of the RAID system.

SUMMARY OF THE INVENTION

The inventive system includes a multi-tasking control processor which controls disk write operations and manages data in a write cache such that each disk write operation includes all the adjacent blocks held in the write cache which are within the same chunk.

As data blocks are loaded into the write cache, the processor updates the LRU queue. When the number of blocks in the write cache reaches a first threshold, for example, 80% of the cache capacity, the processor initiates a block-merge task. The processor selects the oldest block in the cache from the LRU queue and determines the upper and lower boundaries of the associated chunk. It then recursively searches through the remaining blocks in the cache for adjacent data blocks which are within the chunk boundaries, and includes these blocks in the next disk write operation.

More specifically, each block held in the write cache has a corresponding "tag," which associates its virtual block number with the write cache storage location containing the block. The processor first searches through the LRU queue to determine if the adjacent block with a lower virtual block number is in the write cache. If an adjacent block is found in the cache, the processor increments a block count, which is a running total of the blocks to be included in the next disk write operation. It determines from the associated tag the address of the cache storage location containing the block and updates a block address table by adding to it that write cache address. The processor then searches for a block which is adjacent to and has a lower block number than the adjacent block, and so forth, until it either reaches the lower chunk boundary or it fails to locate a next adjacent block.

The processor next performs a recursive search for adjacent blocks with higher virtual block numbers. The processor continues this search until it reaches the upper chunk boundary or it fails to locate a next adjacent block. The processor also updates the block count and the address table each time it finds an adjacent block. When all adjacent blocks within a chunk are found the processor performs a disk write operation to transfer to the disk the LRU block and the adjacent blocks found during the searches. Each disk write operation thus involves a single seek operation and the transfer of all of the adjacent blocks in the associated chunk which are held in the write cache.

If the system includes more than one drive, the LRU queue and the tags for the blocks include virtual drive numbers which identify the disk drives to which the data are directed. When the processor is looking for adjacent blocks of data, it searches through the LRU queue for blocks with the same virtual drive number and then searches for the appropriate virtual block numbers.

BRIEF DESCRIPTION OF THE DRAWINGS

The above and further advantages of the invention may be better understood by referring to the following description in conjunction with the accompanying drawings, in which.

DETAILED DESCRIPTION OF A PREFERRED EMBODIMENTS

Figure 1:
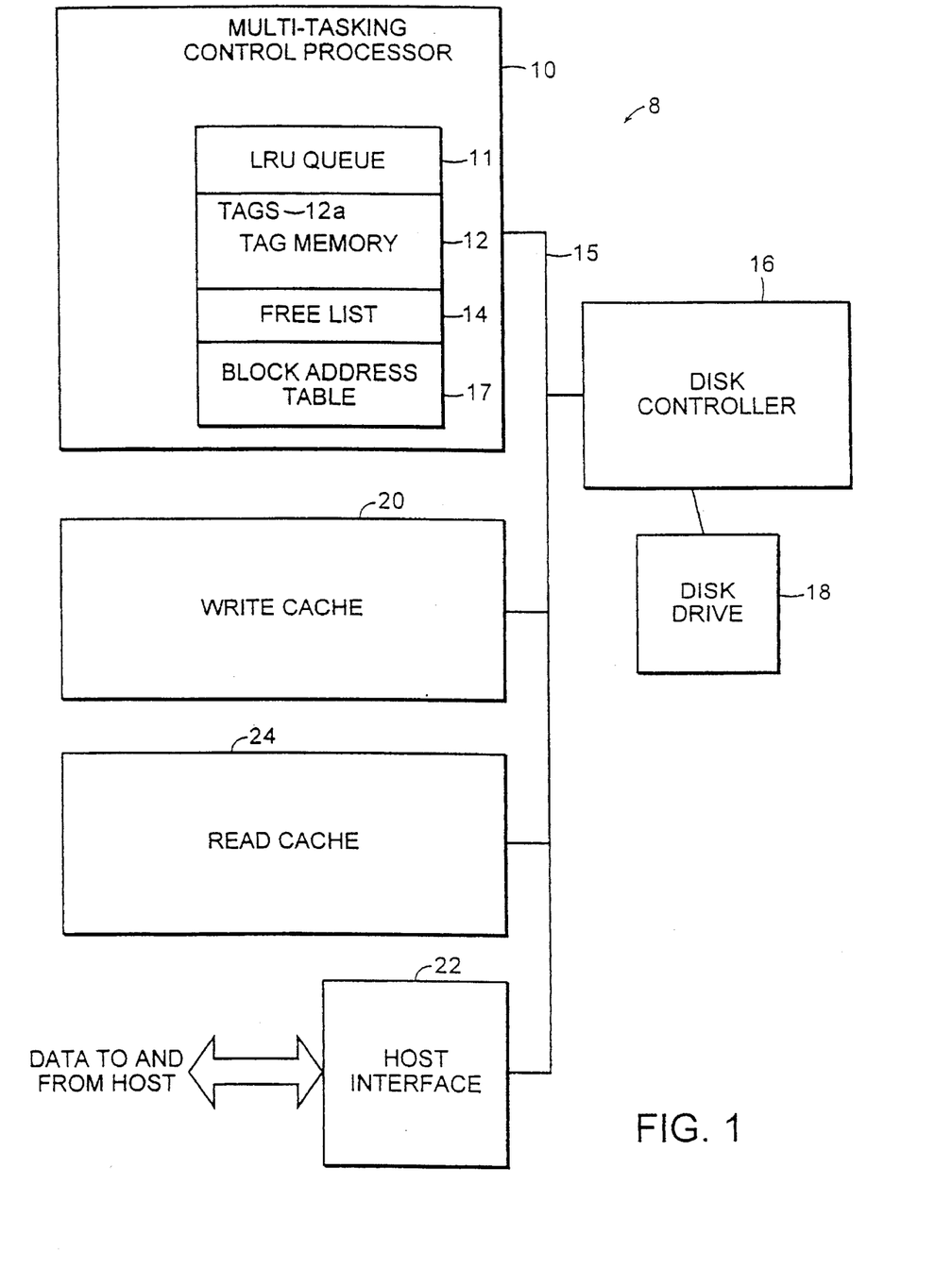
FIG. 1 is a block diagram of a data storage system which includes a processor for controlling write operations constructed in accordance with the invention.

FIG. 1 depicts a data storage system 8 which includes a multitasking control processor 10 for controlling read and write operations directed to a disk drive 18. The processor 10 sends control information over a bus 14 to direct data, respectively, to and from a disk controller 16, a write cache 20 and a host interface 22. The system may also include a read cache 24, which operates under the control of the processor 12. The disk controller 16 operates in a conventional manner to retrieve data from the disk drive 18 during a disk read operation and store data on the disk drive 18 during a disk write operation, performing a seek operation as part of a disk write operation as necessary.

Figure 3A:
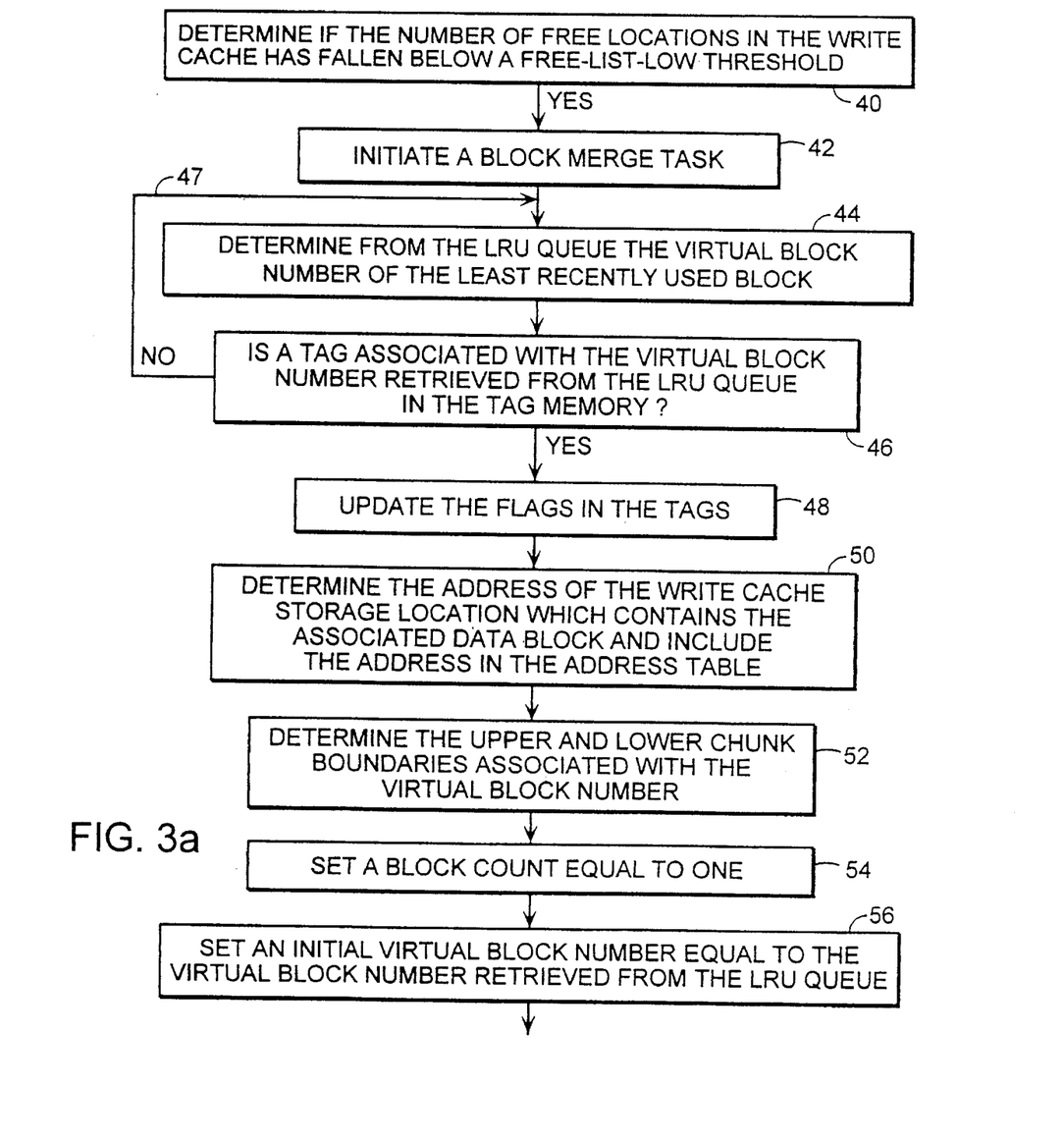
FIGS. 3A, 3B, and 3C are flow charts of the operations of the processor in determining data blocks for inclusion in a disk write operation.
Figure 3B:
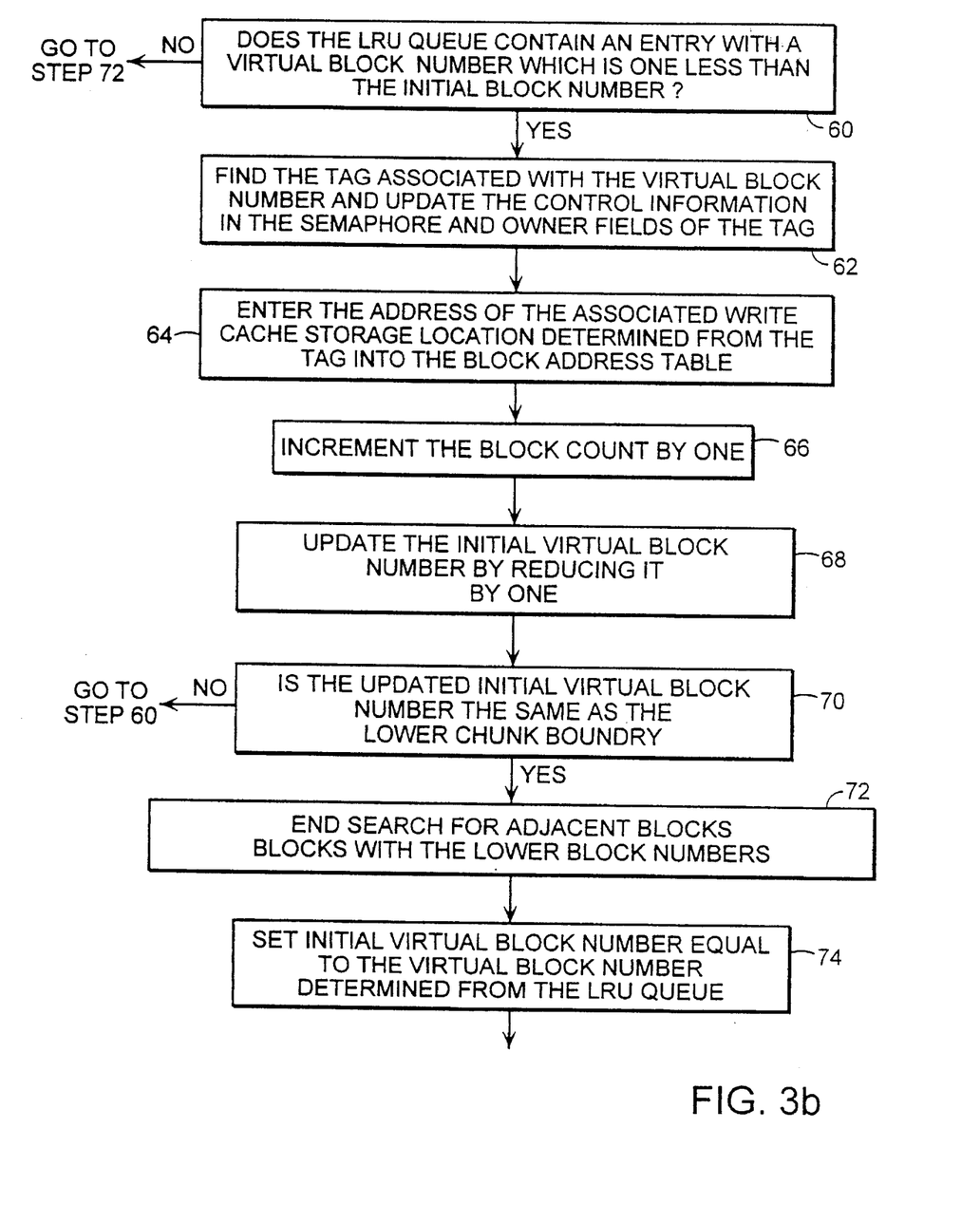
Figure 3C:
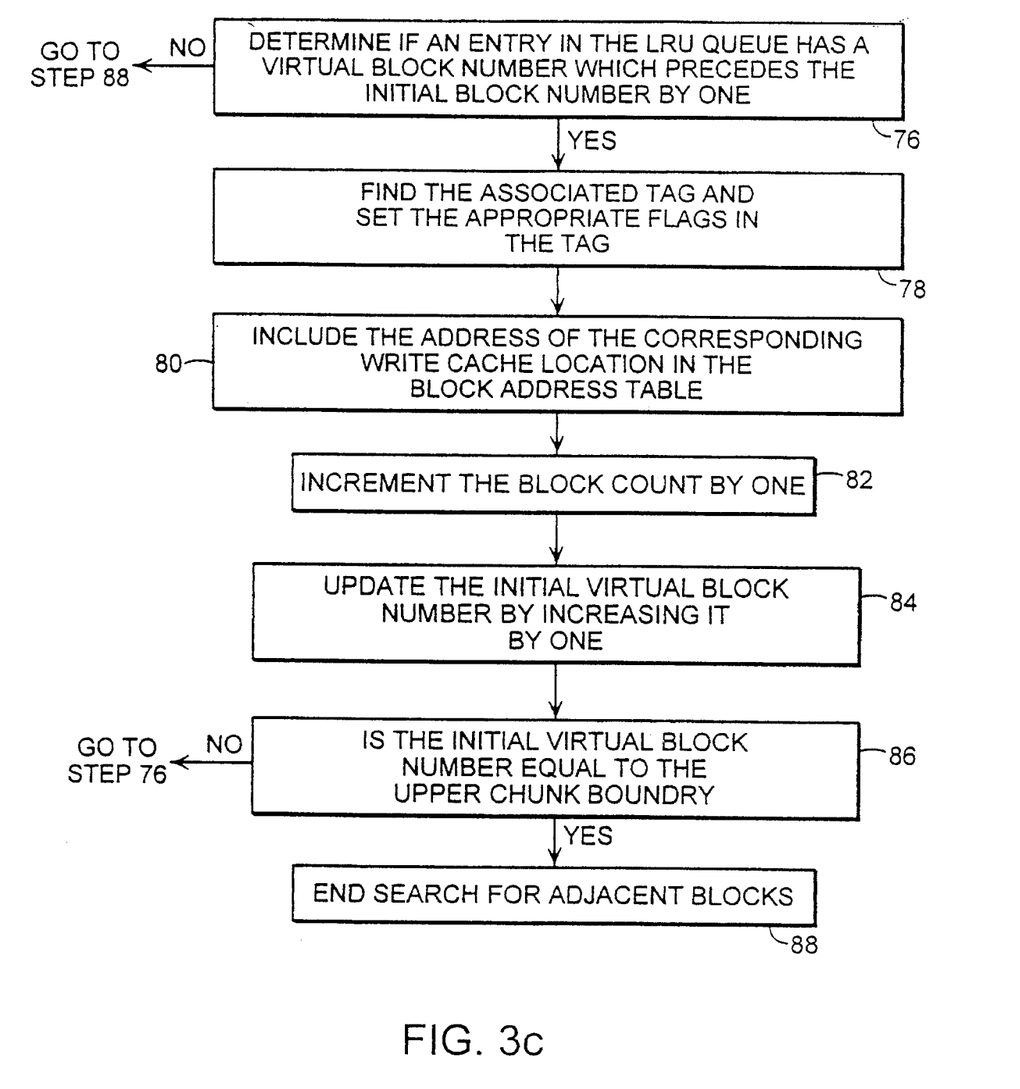

The processor 10 directs data to be stored on the disk first to a write cache 20, which it manages through information stored in a least recently used (LRU) queue 11, a tag memory 12 and a block address table 13, as discussed in more detail below with reference to FIG. 3. Essentially, the processor 10 manages the write cache to include in a write operation as many data blocks as can be written to physically adjacent locations on the disk without requiring an intervening seek operation, that is, as much of a chunk as possible.

As discussed above, the size of a chunk is related to the architecture of the system and the applications performed by the system. For example, a system that performs image processing, which typically involve read and write operations of many sequential data blocks, uses relatively large chunks. For many systems with single data storage devices, a chunk consists of a full data track, typically 128 data blocks.

Each time the host interface 22 directs data to the disk drive 18, the processor 10 redirects the data to the write cache 20. The processor finds a free storage location in the write cache 20 for each data block from the host interface by consulting a location-free list 14. It then sends the data blocks to these write cache locations and updates the list 14, to indicate that these locations are no longer free. It also updates the LRU queue 11, adding to it a block identifier and an associated time of use for each block. The block identifiers are the virtual block numbers assigned to the blocks, in a conventional manner, by the host interface 22.

The LRU queue orders entries by time of use. It is a linked list, with each entry including pointers to a previous and a next entry. The controller also assigns each of the blocks a tag 12a which, as discussed in more detail with reference to FIG. 2 below, includes the virtual block number and various read and write monitor flags. It stores the tags in the tag memory 12, preferably in locations corresponding to the cache locations in which the data blocks are held. If the tags are not stored in corresponding locations, the tags also include the addresses of the cache locations in which the corresponding data blocks are stored.

The control processor 10 monitors the location-free list 14 to determine when the number of free locations reaches a free-block-low threshold, which indicates that the write cache is becoming full, and then a cache-almost-full threshold, which indicates that blocks of data must be transferred from the write cache 20 to the disk drive 18. As discussed in more detail below with reference to FIG. 3, the processor 10 uses the free-block-low threshold to determine when to begin a block-merge task to locate adjacent data blocks in the cache and the cache-almost-full threshold to determine when to begin a block-retire task to transfer these adjacent blocks to disk. The processor thus initiates the block-merge task while it is continuing to process write requests frown the host interface. When the cache becomes almost full, the processor is ready to perform the next disk write operation and free the associated cache storage locations.

Referring still to FIG. 1, the controller 10 maintains a block address table 17, into which it enters the write cache addresses of the blocks to be included in the next disk write operation. The processor adds information to the table 17 during a block-merge operation and removes information from the table during a block-retire operation, as discussed in more detail below with reference to FIG. 3.

Figure 2:
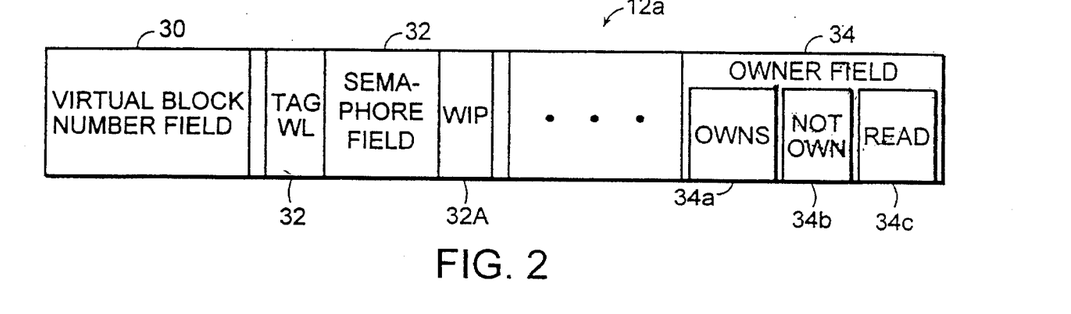
FIG. 2 depicts a write cache tag.

As depicted in FIG. 2, the tag 12a contains a number of fields which are used by the control processor 10 to manage the information in the write cache 20. The tag 12a includes a virtual block number field 30, which indicates the location on disk drive 18 to which the data block is directed, a semaphore field 32 which includes various read and write monitor flags to protect the tag and the corresponding data block from being overwritten at an inappropriate time, and an owner field 34 which indicates the "ownership status" of the associated location in the write cache 20. The semaphore field 32 includes a write-in-progress flag 32a and a tag write-lock flag 32b, which are used in a conventional manner to control access to the tag and the associated data block. The owner field 34 includes three flags, namely, a cache-owns flag 34a, a cache-does-not-own flag 34b and a cache-read-only flag 34c, which are also used in a conventional manner to control access to the associated data block.

When the processor 10 selects a cache storage location for a data block from the free list, the processor asserts the cache owns flag 34a in the associated tag. When that block is to be included in a disk write operation, the processor also asserts the cache read-only flag 34c and the tag write lock flag 32b, so that the block can be read during a read request but can not be overwritten during a write request. When the disk write operation is in progress, the processor asserts the write-in-progress flag 34a so that the data block cannot be overwritten or read.

After the write operation is completed, the processor resets the write-in-progress flag 32a and the tag write lock flag 32b in the semaphore field 32 and the cache-owns and cache-read-only flags 34a and c in the owner field 34. It also asserts the cache does-not-own flag 34b, to indicate that the cache location is now free. These flags which are sometimes referred to as read and write monitors, prevent users from overwriting and/or reading data which is in the process of being transferred to disk. This is important in systems in which multiple users may be simultaneously working on portions of a data file.

Referring now to FIGS. 1, 3A, 3B, and 3C; the control processor 10 monitors the location-free table 14 to determine if the number of locations in the write cache 20 which are free has fallen below a free-list-low threshold (step 40). This free-list-low threshold relates to a condition in which a relatively high fraction of the total number of cache blocks are holding data to be written to disk. When this threshold is reached, the processor initiates a block-merge task (step 42).

The control processor determines from the LRU queue 11 the virtual block number of the least recently used block, which is the block at the top of the LRU queue (step 44). The processor then uses the virtual block number retrieved from the LRU queue to enter the tag memory 12 and retrieve the associated tag 12a (step 46). If the block has already been written to the disk, the processor does not find a tag and again refers to the LRU for a next virtual block number (step 47). If the processor finds an appropriate tag, the processor enters into the block address table 17 the address of the corresponding write cache storage location, which is the storage location that contains the associated data block (step 48).

The controller next determines the upper and lower chunk boundaries associated with the virtual block number (step 50). It sets a block count equal to one (step 52), sets an initial virtual block number equal to the virtual block number of the identified LRU data block (step 54) and searches through either the tag memory 12 or the LRU queue 11 to find an entry with a virtual block number which is one less than the initial virtual block number (step 56). If the controller finds such an entry, it finds the associated tag, updates the control information in the semaphore and owner fields of the tag, as discussed above, and enters the address of the associated write cache storage location into the block address table 17 (step 58).

The controller increments the block count by one, to indicate that an associated write operation will include two blocks of data (step 60). Next, it updates the initial virtual block number by reducing it by one or setting it to the virtual block number of the adjacent block (step 62). If this updated initial virtual block number is the same as the lower chunk boundary, the controller ends its search for adjacent blocks having lower block numbers (steps 64–66). Otherwise, the controller continues its search for adjacent blocks with lower block numbers by repeating the operations discussed above (step 65). The controller continues looking for adjacent blocks with lower virtual block numbers until it reaches the lower chunk boundary or it cannot find an adjacent block (steps 60 and 70–72).

Once the processor has finished its search for adjacent blocks with lower block numbers, it begins a similar search for adjacent blocks with higher block numbers. Accordingly, the controller sets the initial virtual block number to the virtual block number received from the LRU queue 11 (step 68). It then searches through either the LRU queue or the tag memory 12 for a virtual block number which proceeds the initial block number by one (step 70). The controller does not, however, reset the block count since the adjacent blocks with higher block numbers will be included in the same write operation as the blocks found in searching through the lower block numbers. If the controller finds an entry with the appropriate virtual block number, it increments the block count by one, sets the appropriate flags in the corresponding tag and adds the associated write cache address to the block address table 17 (steps 78–82).

The processor 10 updates the initial virtual block number by increasing it by one (step 84) and if the number does not equal the upper chunk boundary again searches for a block with a virtual block number which is one greater than the initial block number (step 86). The processor continues to look for adjacent blocks, add their virtual block numbers and locations to the block address table and appropriately increment the block count and the initial virtual block number until either it reaches the upper chunk boundary or it cannot find a next adjacent block (steps 76 and 86–88).

At the end of these two searching operations, the controller has a count of the number of blocks included in the write operation, and the locations of the blocks in the cache which are to be included in the write operation in block address table 17. At the same time the processor 10 is performing the searches, it is also handling data requests from the host, reading data from the disk to the read cache 24 and writing data to the write cache 20. It is also appropriately updating the LRU queue 11, the tag memory 12, and the location-free-list 14.

Figure 4:
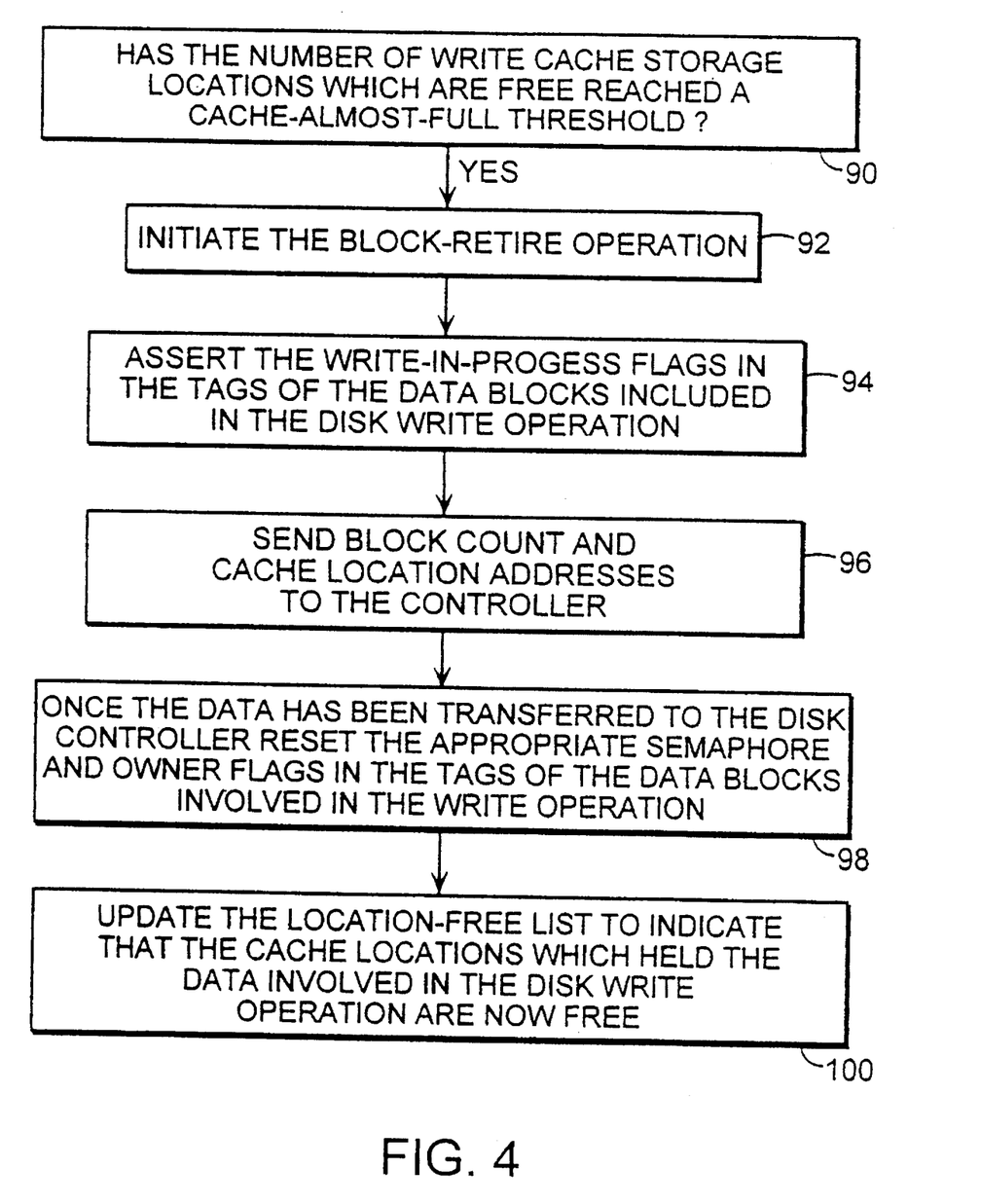
FIG. 4 is flow chart of the operations of the processor in performing a block-retire task.

Referring now to FIG. 4, when the processor 10 has found all the adjacent blocks in the write cache, it initiates a block-retire operation (steps 90–92). It then asserts the write-in-progress flags in the tags of the blocks included in the disk write operation (step 94). Next, it sends to the disk controller 16 control information which includes the number of blocks in the disk write operation and the addresses of the write cache storage locations holding the blocks included in the write operation (step 96). The controller then either directly enters the write cache or performs a conventional "scatter-gather" operation to retrieve the data blocks in order from the cache. The controller performs an initial seek operation to position the read/write head over an appropriate portion of the disk waits for the appropriate storage location to rotate under the head, and then writes the data to the disk in contiguous storage locations—without repositioning the read/write head.

After the data blocks have been transferred to the disk, the control processor 10 resets the appropriate semaphore and owner flags in the tags 12a to indicate that the associated data blocks are no longer involved in a write operation and that the cache no longer "owns" the information held in the associated cache storage locations (step 98). The controller also updates the location-free list 14 to indicate that these cache locations are now free (step 100).

Figure 5:
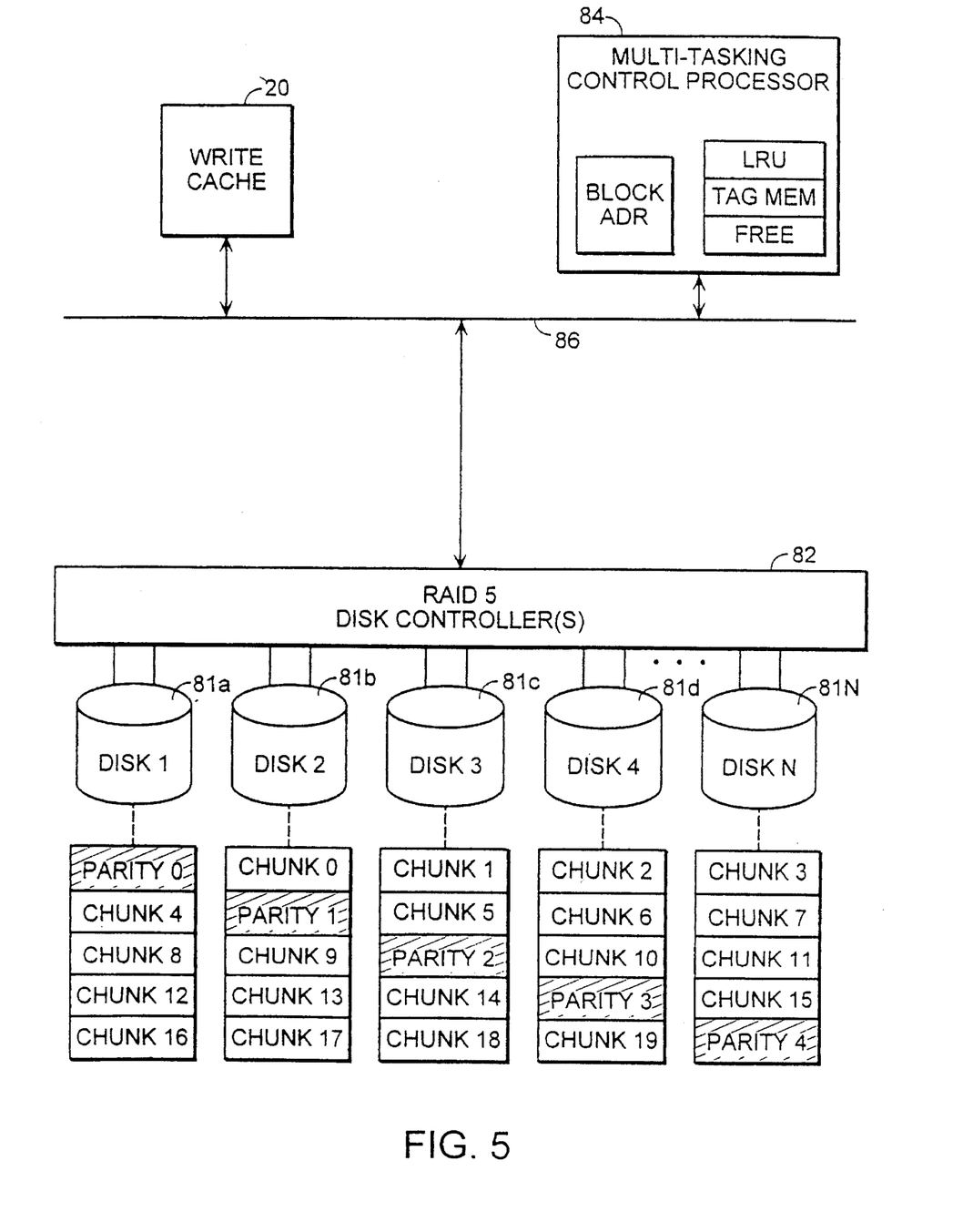
FIG. 5 is a functional block diagram of a RAID system.

Referring now to FIG. 5, a system 80 configured in a RAID configuration includes disk drives 81A through 81N and one or more disk controllers 82. These disk controllers, like the disk controller 16 of FIG. 1, are controlled by a multi-tasking control processor 84 over a bus 86.

Before data blocks are written to disk in the RAID system a parity block is generated to protect against the failure of one of the drives. Accordingly, data blocks stored in a corresponding location on n-1 of the disks are exclusive OR'd (XOR'd) together to form a parity block. This parity block is then stored in the corresponding storage location of another of the drives. The system distributes the data and parity blocks across the disks, writing, for example, parity information on drive 0 for data stored in a first set of corresponding storage locations on drives 1 to (n-1), and parity information on drive 1 for data stored in a next set of corresponding storage locations on drives 0 and 2 to (n-1), and so forth. Data chunks which are XOR'd to generate a parity chunk, and the parity chunk are referred to collectively as a stripe. Accordingly, chunks 0–3 which are XOR'd to form parity chunk 0, and the parity chunk 0 form a stripe.

In some RAID systems data transfer operations can be made more efficient by including in the operation all or a part of a stripe. In such systems, the processor 84 searches beyond the chunk boundaries and up to the stripe boundaries for adjacent blocks.

The processor 84 produces tags 12a for the blocks held in the write cache, as discussed above. It adds to these tags an additional virtual disk field which includes an identifier for a disk drive 81. It adds the same field to the entries in the LRU queue 11, also.

The processor 84 performs block-merge and block-retire operations in the same manner as processor 10, except that it searches for adjacent blocks first within a chunk on the drive to which the LRU block is directed, and then, as appropriate, for corresponding blocks within chunks in the same stripe on different drives. To search beyond the chunk boundaries the processor 84 first finds entries with a desired virtual disk number, and then determines if the write cache contains blocks stored in corresponding storage locations on this drive. The processor 84 thus searches through the LRU queue for blocks with the same virtual block numbers as the adjacent blocks found when searching within the chunk boundaries associated with the LRU block. Next, it increments or decrements as appropriate, the virtual disk number and again searches for blocks with the same virtual block numbers, and so forth until the stripe boundaries are reached.

The processor 84 performs the same tag, free list, block count and address table updating operations discussed with reference to FIGS. 3A, 3B, and 3C; thus, maintains a running total of the blocks involved in a write operation and a table of the cache addresses for these blocks. Also, it sets the appropriate flags in the tags during the block-merge and block-retire tasks, as discussed above, and after their completion of the block-retire task resets the various flags to indicate that the various cache locations are free.

The systems described above efficiently retire the least recently used blocks and all blocks held in the write cache which are to be stored in physically adjacent locations on the disk and within the same chunk and, as appropriate, within the same stripe. The system employs two thresholds, a first one to determine when to perform a block-merge task and a lower one to determine when to perform a block-retire task. The system thus performs its block merge task while other information is being read from a disk and held in a read cache or received from the host and held in a write cache. When the write cache later becomes full, the processor performs a disk write operation using the information obtained during the block-merge operation. Accordingly, the write operations can be performed relatively quickly when the write cache is almost full, and locations in the cache thus freed for new data.

What is claimed is:

1. A system for managing a write cache to include in a write operation adjacent blocks in a chunk, the system including:

A. data storage device including a plurality of storage locations, each location holding a block of data;

B. a controller for managing the write cache and the data storage device, the controller including
   i. an address table for storing cache addresses of blocks included in a write operation,
   ii. a least recently used queue for listing block identifiers in order of use of the corresponding data blocks;
   iii. a storage-location-free list for storing information relating to free cache storage locations, the controller monitoring the storage location free list and when the list reaches a free-location-low threshold, (a) determining if blocks adjacent to a least recently used block are held in the write cache, (b) including the addresses of the least recently used block and the adjacent data blocks in the address table and (c) when the adjacent blocks, that are within associated chunk boundaries and stored in the cache, have been located, performing a storage device write operation to transfer the data blocks identified in the address table to the data storage device.

2. The system of claim 1, wherein the least recently used queue lists block identifiers that include a virtual block number which identifies a block and the data storage device location to which the block is directed; and the controller further includes searching means for searching the least recently used queue to determine if blocks with virtual block numbers consecutive to the virtual block number of the least recently used block are held in the write cache.

3. The system of claim 2, wherein the search means includes means for determining chink boundaries associated with the least recently used block;

means for determining if blocks with consecutive virtual block numbers lower than the virtual block number of the least recently used block and within the chunk boundaries are held in the write cache; and blocks with consecutive virtual block numbers higher than the virtual block number of the least recently used block and within the chunk boundaries are held in the write cache.

4. A method for merging blocks in a write cache for inclusion in a write operation, the method including the steps of:

A. maintaining a list of free write cache locations and a least recently used queue ordering block identifiers by time of use;

B. when the list reaches a free-location-low threshold, determining the least recently used data block in the write cache;

C. initializing a block count;

D. determining if a block which is adjacent to the least recently used block and has a block identifier which is one less than the least recently used block is held in the write cache;

E. if an adjacent block is found in the write cache, maintaining a list of the cache addresses of the least recently used block and the adjacent block;

F. incrementing the block count;

G. determining if the adjacent block is on a chunk boundary, and if not, determining if a block adjacent to the adjacent block is held in the write cache;

H. if an adjacent block is found, repeating steps E–G;

I. if an adjacent block is not found determining if an adjacent block with an identifier which is one greater than the identifier of the least recently used block is held in the write cache;

J. if an adjacent block is found, updating the list of the cache addresses of adjacent blocks;

K. incrementing the block count;

L. determining if the adjacent block with a higher identifier is on a chunk boundary;

M. if the block is not on the chunk boundary, determining if a block adjacent to the adjacent block with the higher block number is held in the write cache;

N. if so, repeating steps J–M until a chunk boundary is reached or an adjacent block is not found.

5. A system for managing a write cache to include in a write operation adjacent blocks that are held in the write cache, the system including:

A. multiple data storage devices, each storage device including a plurality of storage locations, each location holding a block of data;

B. a controller for managing the write cache and the data storage devices, the controller including
   i. an address table for storing cache addresses of blocks included in a next data storage write operation,
   ii. a least recently used queue for listing block identifiers in order of use of the corresponding blocks;
   iii. a list for storing information relating to free cache storage locations, the controller monitoring the list and when the list reaches a free-location-low threshold, (a) determining if adjacent blocks to a least recently used block are held in the write cache, (b) listing the addresses of the least recently used block and the adjacent blocks in the address table to include the blocks in a single write operation and (c) when the adjacent blocks, that are within associated boundaries and stored in the cache, have been located, performing a write operation to transfer the blocks identified in the address table to the data storage devices.

6. The system of claim 5, wherein the least recently used queue lists a data block by a virtual block number, which identifies the block and the data storage device location to which the block is directed, and a virtual device number, which identifies the data storage device to which the block is directed; and the controller further includes searching means for searching the least recently used queue to determine if blocks with virtual block numbers consecutive to the block number of the least recently used block are held in the write cache.

7. The system of claim 6, wherein the search means includes:

means for determining chunk boundaries associated with the least recently used block;

means for determining if blocks with consecutive virtual block numbers lower than the virtual block number of the least recently used block and within the chunk boundaries are held in the write cache; and blocks with consecutive virtual block numbers higher than the virtual block number of the least recently used block and within the chunk boundaries are held in the write cache.

8. The system of claim 7, wherein the search means includes means for determining stripe boundaries; and means for determining if corresponding adjacent blocks intended for a different chunk which is within the stripe boundaries are held within the write cache.

9. A method for identifying blocks held in a write cache for inclusion in a next storage device write operation to one or more storage devices in a multiple device storage system, the method including the steps of:

A. maintaining a list of free write cache locations and a least recently used queue which lists block identifiers by order of use of the corresponding data blocks, the block identifiers including a virtual block number and a virtual storage device number;

B. when the list reaches a free-location-low threshold, determining which of the blocks held in the write cache is the least recently used block;

C. initializing a block count;

D. determining if an adjacent block, which has a block number which is one less than the least recently used block and the same virtual device number, is held in the write cache;

E. if an adjacent block is found in the write cache, maintaining a list of the cache addresses of the least recently used block and the adjacent block;

F. incrementing the block count;

G. determining if the adjacent block is on a chunk boundary, and if not, determining if a block adjacent to the adjacent block is held in the write cache;

H. if an adjacent block is found, repeating steps E–G;

I. if an adjacent block is not found determining if an adjacent block with a block number which is one greater than the block number of the least recently used block and the same virtual device number, is held in the write cache;

J. if an adjacent block with a higher block number is found in the write cache, updating the list of the cache addresses of adjacent blocks;

K. incrementing the block count;

L. determining if the adjacent block with a higher block number is on a chunk boundary;

M. if the block is not on the chunk boundary, determining if a block adjacent to the adjacent block with the higher block number is held in the write cache;

N. if so, repeating steps J–M until a chunk boundary is reached or an adjacent block is not found.

10. The method of claim 9 further including the step of determining if corresponding adjacent blocks in a different chunk within the same stripe are held in the write cache.

11. A system for managing a write cache to include in a write operation adjacent blocks in a chunk, the system including:

A. a host for interconnecting one or more users to the system;

B. one or more data storage devices; and

C. a controller for simultaneously managing the write cache and data transfer requests from the host, the controller including i. an address table for storing cache addresses of blocks included in a write operation, ii. a least recently used queue for listing block identifiers in order of use of the corresponding data blocks;

iii. a storage-location-free list for storing information relating to free cache storage locations, the controller monitoring the storage location free list and when the list reaches a freelocation-low threshold, (a) determining if blocks adjacent to a least recently used block are held in the write cache, (b) including the addresses of the least recently used block and the adjacent data blocks in the address table and (c) when the adjacent blocks stored in the cache have all been located performing a storage device write operation to transfer the data blocks identified in the address table to the data storage device.

* * * * *